Patented Apr. 15, 1952

2,592,585

UNITED STATES PATENT OFFICE 2,592,585

CORN MILLING TEST

Majel M. MacMasters, Peggy Baird, and Carl E. Rist, Peoria, Ill., assignors to the United States of America as represented by the Secretary of Agriculture No Drawing. Application March 14, 1951, Serial No. 215,620

3 Claims. (Cl. 73—432)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to a novel method of control and assay of corn, particularly in conjunction with subsequent milling processes involving the corn. More particularly, the invention relates to a method for determining the millability of corn whereby corn unsuitable for milling purposes can be detected by a novel and rapid test.

A major proportion of corn from farms in this country, finding its way into industrial channels, goes into the wet milling and dry milling industries. In these industries, starch, corn protein, corn oil, meal, special feed and feed concentrates and industrially processed cereal foods are produced.

The products of the corn milling industry represent a considerable volume of the staple trade and commerce of the land. Modern corn milling utilizes a maximum of scientific methods and scientifically designed equipment, reducing wastage to a minimum, and producing the wide variety of industrially important products previously mentioned.

In recent years, however, corn millers have encountered increasingly difficult problems in milling corn harvested and processed by current agricultural and storage equipment. Consequently, corn millers are experiencing an intensifying need for a rapid test to determine, before purchase, the suitability of corn for their use. Unsuitable corn may then be diverted to other more suitable uses with a consonant saving of valuable food material and money. In the past few years, this need has grown as the result of the increasingly prevalent practice of drying corn artificially. Several factors have contributed to make artificial drying an increasingly common practice, chief of which is the present widespread use of mechanical corn pickers. Harvest with a corn picker is completed in about one-third, or less, the length of time formerly required for hand picking. Hence much of the corn has less time to dry in the field.

The United States Department of Agriculture has recommended proper procedure for drying corn, but for many reasons a tendency to use too high temperatures, both on the farm and at elevators persists. The use of too high temperatures results in heat-damaged corn, undesirable for the production of starch or for processing by dry milling. Corn dried at temperatures above approximately 130° F. gives harder grits and more rubbery germ than that dried at lower temperatures. There is also a marked tendency for oil to be found in starch separated from the overheated corn.

Freezing, as well as overheating, may likewise result in damaged corn, if the moisture content of the corn is relatively high, for example, corn containing more than about 23 percent moisture after being frozen under conditions prevailing in farm and elevator storage.

We have found a close correlation between the millability of corn and the viability of the corn germ. This is particularly true of mature corn that has been killed by heat or by natural freezing. We have, moreover, discovered that a specific viability test hereafter to be described, is of great value in predetermining the suitability of corn for milling. Our test is rapid and can be used with simple equipment in the field, or at corn trading centers.

The viability test with 2,3,5-triphenyltetrazolium chloride, developed by Lakon (Plant Physiol. 24: 389–394) involves the production of an easily discerned carmine-red color in living portions of the germs of seeds. As carried out by prior workers, this test requires a total of 7–18 hours. We have modified the test so that the total time required can be reduced to a maximum of 4 hours and, in actual practice, can give a satisfactory test for millability in about 1 hour. Employing our modification, this test, according to our invention is applied advantageously previous to and in conjunction with milling, either wet or dry, as an excellent predetermination of the millability of the corn. The stained kernels may be dried and stored as a record of the viability.

According to our invention, corn, previous to milling, is sampled and the sample usually softened by soaking in water. After soaking, each kernel to be tested is bisected longitudinally perpendicular to the broad face. The cut may be made with any sharp instrument, for example, a razor blade, if desired, while the kernel is held under water. One-half of each kernel is laid, cut side down, in a container, i. e., dish, containing sufficient aqueous triphenyltetrazolium chloride solution to cover the kernel pieces. The dish may then be placed in a dark region for a period up to one and one-half hours or longer. The period sufficient for the purposes of this invention need not exceed 2 hours.

The concentration of the triphenyltetrazolium chloride solution should be at least 0.5 percent, preferably about 1.0 percent. The upper limit of concentration is not critical. A broad and rather definitive test of viability and milling quality may be made, if desired, by using a staining time of one and one-half hours or more and counting as acceptable for milling those sample kernels which exhibit a pink to carmine-red coloration of at least the plumule and mesocotyl region, including the adventitious root buds, and the entire midsection of the scutellum of the germ.

In strongly viable corn the entire germ, composed of the embryonic plant and the scutellum, is colored. If only strongly viable corn is considered to be suitable for use, and this is an acceptable standard of practice, for by it a reasonably accurate estimation of the millability of the corn can be made, the period of contact of the kernel pieces with the reagent can be limited to about 30 minutes. In this case, those pieces showing a pink color over the entire cut surface of the germ are counted as viable.

A close estimate of the viability of corn, sufficient for most practical purposes, can be made with triphenyltetrazolium chloride in one hour or less. The corn is bisected without the preliminary soaking, and the viability is determined after a 30-minute to 1-hr. staining period, the coloration being a pink to carmine-red.

Certain precautions should be observed in applying the test. For example, there may be some mechanical difficulty in bisecting the hard kernel if the accelerated test is employed. The resulting damage to the cells sometimes causes a heavy scum which must be removed before the test.

Care must be taken in bisecting the kernels in order to insure cutting through the upper portion of the embryonic plant. The surfaces of tissues not bisected do not readily take up the reagent, and a proper interpretation of the test is difficult. In testing corn heavily contaminated with bacteria, a colored deposit may form over the cut surface. This deposit need not interfere with the test, however; and it can be scraped away before the kernel is examined. The reagent solution is sensitive to light, but it can be kept for several months in a dark bottle stored in a cool place. It is light amber when prepared, and the appearance of a dark amber color indicates that it is no longer useful.

Corn, which has previously been frozen, often gives a purplish-red color, rather than the usual carmine-red. This indicates that the germ, if not already non-viable, is in the process of dying.

The following specific examples illustrate the invention.

EXAMPLE 1

Six samples of naturally soft, shelled corn, not moldy, containing from 18.6 to 30.3 percent moisture were dried immediately upon receipt at temperatures varying over 10° intervals from 110° to 220° F. For drying, the corn was placed in 1 x 5 x 5-inch containers made of ¼-inch wire cloth. The containers were filled with corn and placed in a forced-draft oven maintained at the required temperature. The samples were dried to approximately 13 percent moisture content. One sample was also obtained after commercial drying, and one which had been dried artificially on a farm.

After drying, the kernels were soaked for one hour in distilled water, cut longitudinally perpendicular to the broad face and placed in a Petri dish containing 1 percent triphenyltetrazolium chloride. The dish was then placed in a dark cabinet at room temperature for 1 hour. The kernel pieces were then examined to determine viability. The difference between results obtained on samples of the same corn by standard germination test and the triphenyltetrazolium chloride test was within the 5 percent range. As determined by the latter test, the samples were designated viable or non-viable, as tabulated in Table I.

*Table I*

| Sample No. | Percent Germination | |
| --- | --- | --- |
| | Triphenyl-tetrazolium Chloride Method | Standard Blotter Method |
| 1 | 79 | 75 |
| 2 | 87 | 91 |
| 3 | 2 | 0 |
| 4 | 15 | 12 |
| 5 | 51 | 47 |
| 6 | 7 | 7 |

EXAMPLE 2

Six samples of yellow dent corn, harvested at varying stages of maturity and kiln dried at various temperatures were subjected to viability tests in the same manner as those of the foregoing example. These samples were then wet milled by the following procedure.

Four hundred grams (weight, as received) of each sample were placed in a 2-liter Erlenmeyer flask with bottom drawn to form an inverted cone, and steeped for 6 hours at 49° C. in 1,000 ml. of a circulating aqueous steep solution containing 0.05 percent $SO_2$. Starting at the end of 6 hours, a 0.2 $SO_2$ solution was slowly fed into the steeping flask at a rate of 1,000 ml. per 18 hours. To maintain a constant volume, an equal amount of steeping solution was removed from the flask by a siphon system.

At the end of the 24-hr. steeping period, the steeped solution was drained off and the corn was ground, and then sieved through a 200-mesh copper screen. The separated fiber was mixed with water and ground twice more, and the ground slurry screened to separate the starch and gluten from the fiber. The fiber was washed, and the screened washings added to the combined slurries. The gluten and starch were separated by a series of centrifuge cycles constituting shaking, centrifuging, decanting, and removing the gluten layer. The recovered starch was dried to about 12 percent moisture in a forced draft oven at 40° C.

In Table II, the results of the above procedure are summarized. Samples No. 7–9 are those possessing satisfactory milling characteristics. Whereas, samples No. 10–12, showing negative viability tests, also exhibit unsatisfactory milling characteristics in low starch recovery, excessive protein in the starch, or both.

Table II

| Sample No. | Drying Temperature °F. | Percent Viability With Triphenyltetrazolium Chloride | Percent Protein in Starch (N×6.25) | Percent Starch Recovery |
|---|---|---|---|---|
| 7 | 110 | 94 | 0.38 | 77 |
| 8 | 75 | 88 | 0.25 | 79 |
| 9 | 124 | 82 | 0.38 | 79 |
| 10 | 160 | 0 | 0.69 | 63 |
| 11 | 181 | 0 | 0.31 | 65 |
| 12 | 183 | 0 | 0.31 | 57 |

The foregoing data illustrate the close correlation between our triphenyltetrazolium chloride test and the wet millability of the corn. A similar correlation exists for the corn when subsequently processed by dry milling.

We claim:

1. In the process of treating corn by industrial milling processes, the step which comprises subjecting a representative sample of seed corn to a millability test comprising bisecting by cutting kernels of seed corn longitudinally perpendicular to the broad face of the kernels and exposing the cut surface of the kernels to an aqueous solution of 2,3,5-triphenyltetrazolium chloride for ½ to 2 hours, whereby millability of said sample is indicated by the appearance of a pink to carmine-red coloration of at least the plumule and mesocotyl region, including the adventitous root buds, and the entire midsection of the scutellum of said germ.

2. Process of claim 1 in which the kernels are softened in water prior to cutting.

3. The method which comprises cutting corn kernels longitudinally perpendicular to the broad face and subjecting the cut surfaces to the action of an aqueous solution of 2,3,5-triphenyltetrazolium chloride for approximately 1 hour, whereby viability and millability of said corn is indicated by the appearance of a pink to carmine-red coloration of at least the plumule and mesocotyl region, including the adventitious root buds, and the entire midsection of the scutellum of said germ.

MAJEL M. MacMASTERS.
PEGGY BAIRD.
CARL E. RIST.

REFERENCES CITED

The following references are of record in the file of this patent:

UNITED STATES PATENTS

| Number | Name | Date |
|---|---|---|
| 2,525,789 | Frankenfeld | Oct. 17, 1950 |
| 2,562,902 | Fischer | Aug. 7, 1951 |